United States Patent [19]

Stanley et al.

[11] Patent Number: 5,378,491
[45] Date of Patent: Jan. 3, 1995

[54] METHOD OF PREPARING A STARCH HYDROLYSATE, AN AQUEOUS STARCH HYDROLYSATE DISPERSION, METHOD OF PREPARING A FOOD CONTAINING A STARCH HYDROLYSATE, AND A FOOD FORMULATION CONTAINING A STARCH HYDROLYSATE

[75] Inventors: Keith D. Stanley; Donald W. Harris, both of Decatur, Ill.

[73] Assignee: A.E. Staley Manufacturing Co., Decatur, Ill.

[21] Appl. No.: 918,952

[22] Filed: Jul. 30, 1992

Related U.S. Application Data

[63] Continuation-in-part of Ser. No. 746,432, Aug. 16, 1991, abandoned, and a continuation-in-part of Ser. No. 908,728, Jul. 6, 1992, which is a continuation of Ser. No. 578,994, Sep. 6, 1990, abandoned, which is a continuation-in-part of Ser. No. 483,208, Feb. 20, 1990, abandoned.

[51] Int. Cl.$^6$ .................................................. A23L 1/05
[52] U.S. Cl. ...................................... 426/661; 127/32; 127/38; 127/65; 426/521; 426/573; 426/578
[58] Field of Search ............... 426/661, 573, 578, 658, 426/603, 521, 604, 804, 18, 28; 127/29, 32, 33, 36, 38, 39, 40, 58, 65, 69, 70, 71; 252/315.3

[56] References Cited

U.S. PATENT DOCUMENTS

| | | | |
|---|---|---|---|
| 675,822 | 6/1901 | Duryea | 127/33 |
| 696,949 | 4/1902 | Duryea | 127/33 |
| 2,068,051 | 1/1937 | Canton | 426/578 |
| 2,131,064 | 9/1938 | Musher | 426/633 |
| 2,503,053 | 4/1950 | Kerr | 127/38 |
| 2,791,508 | 5/1957 | Rivoche | 426/573 |
| 2,805,995 | 9/1957 | Adelson | 252/33.6 |
| 2,978,446 | 4/1961 | Battista et al. | 260/212 |
| 3,023,104 | 2/1962 | Battista et al. | 99/1 |
| 3,067,067 | 12/1962 | Etheridge | 127/71 |
| 3,093,486 | 6/1963 | Krett et al. | 99/144 |
| 3,133,836 | 5/1964 | Winfrey | 127/71 |
| 3,197,337 | 7/1965 | Schink | 127/28 |
| 3,219,483 | 11/1965 | Goos | 127/28 |
| 3,351,489 | 11/1967 | Battista | 127/32 |
| 3,532,602 | 10/1970 | Seidman | 195/31 |
| 3,556,942 | 1/1971 | Hathaway | 195/31 |
| 3,582,359 | 6/1971 | Horn | 426/573 |
| 3,586,536 | 6/1971 | Germino | 127/32 |
| 3,600,186 | 8/1971 | Mattson | 99/1 |
| 3,666,557 | 5/1972 | Jensen et al. | 127/32 |
| 3,671,269 | 6/1972 | Germino | 99/139 |
| 3,705,811 | 12/1972 | Yoshida et al. | 99/91 |
| 3,717,475 | 2/1973 | Germino | 99/134 |
| 3,730,840 | 5/1973 | Sugimoto et al. | 195/31 R |
| 3,830,697 | 8/1974 | Yoshida | 195/31 R |
| 3,879,212 | 4/1975 | Yoshida | 106/213 |

(List continued on next page.)

FOREIGN PATENT DOCUMENTS 1016006 8/1977 Canada .

(List continued on next page.)

OTHER PUBLICATIONS

Anter et al., DD-161178-A, Feb. 1985, abstract only.

(List continued on next page.)

*Primary Examiner*—Czaja: Donald E.
*Assistant Examiner*—Leslie Wong
*Attorney, Agent, or Firm*—Arnold, White & Durkee

[57] ABSTRACT

A method or preparing reduced fat foods is provided which employs a fragmented, granular amylose starch having a melting onset temperature (as measured by differential scanning calorimetry) of greater than about 70° C. when measured at 20% starch hydrolysate solids. The fragmented, granular amylose starch hydrolysate is prepared by hydrolyzing a granular amylose starch in a strongly acidic aqueous slurry at a temperature greater than 70° C. or by hydrolysis at a lower temperature followed by heating a slurry, after neutralization, to raise the melting onset temperature. Also provided are food formulations in which the fragmented, granular amylose starch hydrolysate is used to replace fat and aqueous dispersions of the fragmented, granular amylose starch hydrolysate which are useful therein.

18 Claims, 2 Drawing Sheets

U.S. PATENT DOCUMENTS

| | | | |
|---|---|---|---|
| 3,881,991 | 5/1975 | Kurimoto | 195/31 |
| 3,883,365 | 5/1975 | Forsberg | 127/60 |
| 3,928,062 | 12/1975 | Yamauchi | 127/60 |
| 3,962,465 | 6/1976 | Richter et al. | 426/48 |
| 3,986,890 | 10/1976 | Richter et al. | 127/38 |
| 4,009,291 | 2/1977 | Mitchell et al. | 426/548 |
| 4,069,157 | 1/1978 | Hoover et al. | 210/433 M |
| 4,143,163 | 3/1979 | Hutchison | 426/96 |
| 4,143,174 | 3/1979 | Shah et al. | 426/570 |
| 4,192,900 | 3/1980 | Cheng | 426/578 |
| 4,199,374 | 4/1980 | Dwivedi | 127/60 |
| 4,209,503 | 6/1980 | Shah et al. | 424/49 |
| 4,263,334 | 4/1981 | McGinley | 426/573 |
| 4,276,312 | 6/1981 | Merritt | 426/96 |
| 4,291,065 | 9/1981 | Zobel et al. | 426/549 |
| 4,305,964 | 12/1981 | Moran et al. | 426/99 |
| 4,308,294 | 12/1981 | Rispoli et al. | 426/564 |
| 4,423,084 | 12/1983 | Trainor et al. | 426/589 |
| 4,477,480 | 10/1984 | Seidel et al. | 426/578 |
| 4,492,714 | 1/1985 | Cooper et al. | 426/602 |
| 4,510,166 | 4/1985 | Lenchin et al. | 426/565 |
| 4,533,254 | 8/1985 | Cook et al. | 366/176 |
| 4,536,408 | 8/1985 | Morehouse et al. | 426/250 |
| 4,551,177 | 11/1985 | Trubiano et al. | 106/210 |
| 4,560,559 | 12/1985 | Ottenberg | 426/19 |
| 4,587,131 | 5/1986 | Bodor et al. | 426/603 |
| 4,591,507 | 5/1986 | Bodor et al. | 426/604 |
| 4,643,773 | 2/1987 | Day | 127/30 |
| 4,670,272 | 6/1987 | Chen | 426/573 |
| 4,726,957 | 2/1988 | Lacourse | 426/578 |
| 4,728,526 | 3/1988 | Avera | 426/633 |
| 4,744,987 | 5/1988 | Mehra | 424/156 |
| 4,761,292 | 8/1988 | Augustine et al. | 426/321 |
| 4,787,939 | 11/1989 | Barker | 127/37 |
| 4,810,307 | 3/1989 | Caton | 127/63 |
| 4,810,646 | 3/1989 | Jamas et al. | 435/101 |
| 4,814,195 | 3/1989 | Yokohama | 426/633 |
| 4,828,868 | 5/1989 | Lasdon | 426/633 |
| 4,832,977 | 5/1989 | Avera | 426/633 |
| 4,859,484 | 8/1989 | Bielskis | 426/96 |
| 4,869,919 | 9/1989 | Lowery | 426/604 |
| 4,885,180 | 12/1989 | Cochran et al. | 426/241 |
| 4,886,678 | 12/1989 | Chiu | 426/578 |
| 4,911,946 | 3/1990 | Singer et al. | 426/658 |
| 4,917,915 | 4/1990 | Cain et al. | 426/573 |
| 4,937,091 | 6/1990 | Zallie | 426/582 |
| 4,942,055 | 7/1990 | Avera | 426/633 |
| 4,948,615 | 8/1990 | Zallie | 426/582 |
| 4,954,178 | 9/1990 | Caton | 127/32 |
| 4,957,750 | 9/1990 | Cochran et al. | 426/19 |
| 4,962,094 | 10/1990 | Jamas et al. | 514/54 |
| 4,971,723 | 11/1990 | Chiu et al. | 252/315.3 |
| 4,981,709 | 1/1991 | Furcsik et al. | 426/565 |
| 4,988,531 | 1/1991 | Moore | 426/578 |
| 4,990,355 | 2/1991 | Gupta | 426/602 |
| 5,034,240 | 7/1991 | Tanaka et al. | 426/607 |
| 5,035,904 | 7/1991 | Huang et al. | 426/243 |
| 5,037,929 | 8/1991 | Rajagopalan | 426/578 |
| 5,051,271 | 9/1991 | Iyengar et al. | 426/658 |
| 5,094,872 | 3/1992 | Furcsik et al. | 426/578 |
| 5,104,674 | 4/1992 | Chen et al. | 426/573 |
| 5,106,644 | 4/1992 | El-Nokaly | 426/603 |
| 5,110,612 | 5/1992 | Quarles | 426/573 |
| 5,131,953 | 7/1992 | Kasica | 127/65 |
| 5,137,742 | 8/1992 | Bakal et al. | 426/589 |
| 5,147,665 | 9/1992 | Furcsik | 426/19 |

FOREIGN PATENT DOCUMENTS

| | | |
|---|---|---|
| 0052899 | 2/1982 | European Pat. Off. |
| 0237120 | 9/1987 | European Pat. Off. |
| 0298561 | 1/1989 | European Pat. Off. |
| 0327120 | 8/1989 | European Pat. Off. |
| 0327288 | 8/1989 | European Pat. Off. |
| 0340035 | 11/1989 | European Pat. Off. |
| 0367064 | 5/1990 | European Pat. Off. |
| 0372184 | 6/1990 | European Pat. Off. |
| 0387940 | 9/1990 | European Pat. Off. |
| 0420314 | 4/1991 | European Pat. Off. |
| 0420315 | 4/1991 | European Pat. Off. |
| 0427312 | 5/1991 | European Pat. Off. |
| 0430329 | 6/1991 | European Pat. Off. |
| 0443844 | 8/1991 | European Pat. Off. |
| 0470870 | 2/1992 | European Pat. Off. |
| 0480433 | 4/1992 | European Pat. Off. |
| 0486936 | 5/1992 | European Pat. Off. |
| 110957 | 4/1897 | Germany |
| 3-296501 | 12/1991 | Japan |
| 4-46901 | 2/1992 | Japan |
| 2247242 | 2/1992 | United Kingdom |
| 87/04465 | 7/1987 | WIPO |
| 89/12403 | 12/1989 | WIPO |
| 90/00010 | 1/1990 | WIPO |
| WO90/06343 | 6/1990 | WIPO |
| 90/15147 | 12/1990 | WIPO |
| 91/01091 | 2/1991 | WIPO |
| WO91/01092 | 2/1991 | WIPO |
| 91/07106 | 5/1991 | WIPO |
| WO91/12728 | 9/1991 | WIPO |
| 9202614 | 2/1992 | WIPO |
| WO92/21703 | 12/1992 | WIPO |

OTHER PUBLICATIONS

Potter, N., Food Science, 1978, pp. 199–200, AVI Publishing Co., Inc., Westport, Conn.

Battista et al., Colloidal Molecular Phenomena, Journal of Applied Polymer Science, vol. 11, pp. 481–498 (1967).

Allmere et al., Derwent Abstracts 93-174080 for SU 1736975, May, 1992.

(List continued on next page.)

OTHER PUBLICATIONS

Tegge, "Produkte der sauren Stärkehydrolyse", Die Stärken, pp. 244–246 (1981). (English translation).

"Low fat ground beef patties", brochure, A. E. Staley Mfg. Co. (Oct. 1991).

"Low-fat pork sausage patty", formula sheet CFSF7 196211, A. E. Staley Mfg. Co.

"Staley Formulation of Food Starch-Modified", new product review presented to U.S. Food and Drug Administration by A. E. Staley Mfg. Co. (Nov. 1990).

BeMiller, "Gums", Encyclopedia of Food Science & Technology, vol. 2, pp. 1338–1344 (John Wiley & Sons 1992).

Dickinson, "Particle gels", Chemistry & Industry, pp. 595–599 (Oct. 1990).

Duxbury, "Modified food starches partially replace fats, oils & provide smooth texture", Food Processing, pp. 86–88 (Nov. 1990).

Duxbury, "Pre-hydrated gums eliminate lumping, long hydration times," Food Processing, pp. 44–48 (Jun. 1992).

Falkiewicz, "Avicel in suspensions–dispersion, rheology and colloid science", Soap, Cosmetics, Chemical Specialties, pp. 27–34 (Apr. 1979).

Giese, "Developing low-fat meat products", Food Technology, pp. 100–108 (Apr. 1992).

Kerr, Chemistry and Industry of Starch, 2d ed., pp. 564–567 (Academic Press 1950).

Koizumi et al, "High performance anion-exchange chromatography of homogenous D-gluco oligosaccharides and polysaccharides (polymerization degree equal to or greater that 50) with pulsed amphoteric detection", Journal of Chromatography, vol. 46, pp. 365–373 (1989).

Lansky et al, "Properties of the fractions and linear subfractions from various starches", vol. 71, pp. 4066–4075 (1949).

Manley, Technology of Biscuits, Crackers and Cookies, pp. 335–347 (Ellis Horwood 1983).

Mason, "Chemistry with ultrasound", Critical Reports on Applied Chemistry, vol. 28, pp. 1–26, 91–98, 159–187 (Elsevier Science Publishers 1990).

Matthews, Legumes: Chemistry, Technology, and Human Nutrition, pp. 226–229 (Marcel Dekker 1989).

Matz, Cookie and Cracker Technology, pp. 163–167 (AVI Publishing 1968).

Pancoast et al, Handbook of Sugars, pp. 157–287 (AVI Publishing 1980).

Patterson, Hydrogenation of Fats and Oils, pp. 44–48, 173–182, 291–304 (Applied Science Publishers, 1983).

Pszczola, "Oat-bran-based ingredient blend replaces fat in ground beef and pork sausage", Food Technology, pp. 60–66 (Nov. 1991).

Taki, "Functional ingredient blend produces low-fat meat products to meet consumer expectations", Food Technology, pp. 70–74 (Nov. 1990).

Teot, "Resins, water-soluble", Encyclopedia of Chemical Technology, vol. 20, pp. 207–230 (John Wiley & Sons 1982).

Wang, "Meat processing I", Encyclopedia of Food Engineering, pp. 545–557 (AVI Publishing 1986).

Whistler et al, "Effect of acid hydrolysis on the retrogradation of amylose", Cereal Chemistry, vol. 25, No. 6, pp. 418–424 (1948).

J. Jane et al., "Preparation and Properties of Small-Particle Corn Starch, Cereal Chemistry, vol. 69, pp. 280–283 (1992).

"Paselli SA2, The Natural Alternative to Fats and Oils" (AVEBE b.a., Foxhol, Holland, Ref. No. 05.12.31.167 EF).

T. H. Applewhite, "Fats and Fatty Oils", Encyclopedia of Chemical Technology, vol. 9, pp. 795–831 (Kirk-Othmer, eds., John Wiley & Sons, N.Y., N.Y., 3d ed., 1980).

G. M. Trout, "Pasteurization", Encyclopedia of Food Science, pp. 600–604 (M. S. Peterson and A. H. Johnson, eds., AVI Publ. Co., Westport, Conn., 1978).

"R. L. Whistler et al., Starch: Chemistry and Technology, pp. 25–35 (Academic Press, Inc., New York, N.Y., 1984).

J. Bouchard et al., "High-Performance Liquid Chromatographic Monitoring of Carbohydrate Fractions in Partially Hydrolyzed Corn Starch", J. Agric. Food Chem., vol. 36, pp. 1188–1192 (1988).

F. Reuther et al., "Structure of Maltodextrin Gels-A Small Angle X-Ray Scattering Study", Colloid and Polymer Science, 261, 271–276 (1983).

S. Nara et al., "Study on Relative Crystallinity of Moist Potato Starch" Starke/Starch, vol. 30, pp. 111–114 (1978).

(List continued on next page.)

OTHER PUBLICATIONS

S. Richardson, "Molecular Mobilities of Instant Starch Gels Determined by Oxygen-17 and Carbon-13 Nuclear Magnetic Resonance", *Journal of Food Science*, vol. 53, No. 4, pp. 1175–1180 (1988).

C. Luu et al., "Model Structure for Liquid Water", *Travaux de la Societe de Pharmacie de Montpellier*, vol. 41, No. 3, pp. 203–212 (1981).

D. C. White and G. N. Lauer, "Predicting Gelatinization Temperatures of Starch/Sweetener Systems for Cake Formulation by Differential Scanning Calorimetry I. Development of a Model", *Cereal Foods World*, vol. 35, No. 8, pp. 728–731 (Aug. 1990).

*Encyclopedia of Chemical Technology*, vol. 21, pp. 106–162 (Kirk-Othmer, eds., John Wiley & Sons, Inc., N.Y., N.Y., 1983).

A. C. Lavanchy and F. W. Keith, "Centrifugal Separation", *Encyclopedia of Chemical Technology*, vol. 5, pp. 194–233 (Kirk-Othmer, eds., John Wiley & Sons N.Y., N.Y., 3d ed., 1979).

P. A. Schweitzer, *Handbook of Separation Techniques for Chemical Engineers*, pp. 4–60 to 4–88 (McGraw Hill, N.Y., N.Y., 1988).

D. R. Paul and G. Morel, "Membrane Technology", *Encyclopedia of Chemical Technology*, vol. 15, pp. 92–131 (Kirk-Othmer, eds., John Wiley & Sons, N.Y., N.Y., 3d eds., 1981).

P. R. Klinkowski, "Ultrafiltration", *Encyclopedia of Chemical Technology*, vol. 23, pp. 439–461 (Kirk-Othmer, eds., John Wiley & Sons, N.Y., N.Y., 3d ed., 1983). Solve Tough Process Filtration Problems With Ceraflow Ceramic Systems", a technical bulletin, Lit. No. SD113, 2/89 89–418, published (1989) by Millipore Corporation, Bedford, Mass.

H. Rueter, "Homogenization", *Encyclopedia of Food Science*, pp. 374–376 (M. S. Peterson and A. H. Johnson, eds., AVI Publ. Co., Westport, Conn., 1978).

L. H. Rees and W. D. Pandolfe, "Homogenizers", *Encyclopedia of Food Engineering* pp. 467–472 (C. W. Hall et al., eds., AVI Publ. Co., Westport, Conn. 1986).

W. C. Griffin, "Emulsions", *Encyclopedia of Chemical Technology*, vol. 8, pp. 900–930 (Kirk-Othmer, eds., John Wiley & Sons, N.Y., N.Y., 3d ed., 1979).

"Food Labelling; Serving Sizes", 55 Fed. Reg. 29517 (1990).

"Food Labelling; Definitions of the Terms Cholesterol Free, Low Cholesterol, and Reduced Cholesterol", 55 Fed. Reg. 29456 (1990).

O. B. Wurzburg, *Modified Starches: Properties and Uses*, pp. 18–23, 38–40, 244–245 and 251–252 (CRC Press, Inc., Boca Raton, Fla., 1986).

P. L. Russell et al., "Characterization of Resistant Starch from Wheat and Maize, *Journal of Cereal Science*, vol. 9, pp. 1–15 (1989).

O. A. Battista et al., "Colloidal Macromolecular Phenomena. Part II. Novel Microcrystals of Polymers", *Journal of Applied Polymer Science*, vol. 11, pp. 481–498 (1967).

N. Z. Erdi et al., "Rheological Characteristics of Polymeric Microscrystal-Gels", *Journal of Colloid and Interface Science*, vol. 28, pp. 36–47 (1968).

"NEPOL Amylose", Market Development Bulletin No. 101, A. E. Staley Manufacturing Company (1962).

D. Sievert et al., "Enzyme-Resistant Starch. I. Characterization and Evaluation of Enzymatic, Thermoanalytical, and Microscopic Methods", *Cereal Chemistry*, vol. 66, pp. 342–347 (1989).

J. L. Jane et al., "Structure Studies of Amylose-V Complexes and Retro-Graded Amylose by Action of Alpha Amylases, and a New Method for Preparing Amylodextrins", *Carbohydrate Research*, vol., 132, pp. 105–118 (1984).

"Fat-Sparing Starch Can Replace 100% Fat/Oil for 96% Calorie Reduction", *Food Processing*, p. 38 (Dec. 1990).

R. J. Swientek, "Microfluidizing Technology Enhances Emulsion Stability", *Food Processing*, pp. 152–153 (Jun. 1990).

*RANNIE High Pressure Laboratory Homogeniser*, a service manual Rannie a/s, Roholmsvej 8, DK–2620 Albertslund, Denmark).

O. A. Battista et al., "Microcrystalline Cellulose", *Industrial and Engineering Chemistry*, vol. 54, pp. 20–29 (1962).

"AVICEL RC 581 Technical Bulletin", Bulletin No. RC–11 of FMC Corporation, Marcus Hook, Pa., 11/69–1M.

"AVICEL Mirocrystalline Cellulose; The Non-Caloric Ingredient", a bulletin of American Viscose Corporation, Marcus Hook, Pa. (later a division of FMC Corporation).

"AVICEL RC-591 in Foods", Bulletin No. RC-22, FMC Corporation, Marcus Hook, Pa. (May 1972).

(List continued on next page.)

OTHER PUBLICATIONS

"AVICEL RC in Bakery Products", Bulletin No. RC-35, FMC Corporation, Marcus Hook, Pa.

"AVICEL RC in Canned Foods", Bulletin No. RC-31, FMC Corporation, Marcus Hook, Pa. (1972).

"AVICEL Pricing", a bulletin apparently of American Viscose Corporation, Marcus Hook, Pa.

"C9-112 Microcrystalline Starch", a product bulletin of A. E. Staley Manufacturing Company, Decatur, Ill.

A. H. Young, "Evaluation of Microcrystals Prepared from MIRA-QUIK C in the Pilot Plant Spray Dried in the Presence of Sodium Carboxymethylcellulose (C9-112)", Project Report No. RD 73-17, A. E. Staley Manufacturing Company.

W. C. Mussulman and J. A. Wagoner, "Electron Microscopy of Unmodified and Acid-Modified Corn Starches", *Cereal Chemistry*, vol. 45, pp. 162-171 (1968).

M. Yamaguchi et al., "Electron Microscopic Observations of Waxy Maize Starch", *Journal of Ultrastructure Research*, vol. 69, pp. 249-261 (1979).

W. A. Atwell et al., "Characterization of Quinoa Starch", *Cereal Chemistry*, vol. 60, pp. 9-11 (1982).

"New Generation of Foods With Reduced Fat", *Food Engineering*, pp. 23 and 26 (Jan. 1990).

G. R. Sanderson, "Polysaccharides in Foods", *Food Technology*, pp. 50-57 and 83 (Jul. 1981).

"Gums and Starches Bulk Up Low-Cal Foods", *Food Engineering*, (Jan. 1990).

"STA-SLIM starches", a technical data sheet published by A. E. Staley Manufacturing Company, Decatur, Ill., TDS 507 096060.

"Reduced-Oil Salad Dressings", a technical publication of A. E. Staley Manufacturing Company, Decatur, Ill.

J. D. Dziezak, "Membrane Separation Technology Offers Processors Unlimited Potential", *Food Technology*, 108-113 (Sep. 1990).

R. D. Spies and R. C. Hoseney, "Effect of Sugars on Starch Gelatinization", *Cereal Chemistry*, vol. 59, No. 2, pp. 128-131 (1982).

H. L. Savage et al., "Effects of Certain Sugars and Sugar Alcohols on the Swelling of Cornstarch Granules", *Cereal Chemistry*, vol. 55, No. 4, pp. 447-454 (1978).

K. Ghiasi et al., "Effects of Flour Components and Dough Ingredients on Starch Gelatinization", *Cereal Chemistry*, vol. 60, No. 1, pp. 58-61 (1982).

W. J. Stadelman et al., *Egg and Poultry-Meat Processing*, pp. 52-63 (Ellis Horwood Ltd., Chichester, England, 1988).

N. Krog, "Functions of Emulsifiers in Food Systems", *J. Am. Oil Chemists' Society*, vol. 54, pp. 124-131 (1978).

J. D. Dzlezak, "Emulsifiers: The Interfacial Key to Emulsion Stability", *Food Technology*, vol. 42, No. 10, pp. 171-186.

E. M. A. Willhoft, "Recent Developments on the Bread Staling Problem", *The Bakers Digest*, pp. 14-20 (Dec. 1973).

W. H. Knightly, "The Evolution of Softeners and Conditioners Used in Baked Foods", *The Bakers Digest*, pp. 64-75 (Oct., 1973).

*Bread, Rolls and Sweet Doughs*, pp. 92-95 (Peacock Business Press, 1973).

Data Base WPIL/Derwent AN-80-66061C (38), Derwent Publication Ltd., London, England, abstract of German Patent DD-A-142646 (H. Richter) (Jul. 10, 1980).

Data Base WPIL/Derwent AN-85-210261 (35), Derwent Publications Ltd., London, England, abstract of German Patent DD-A-161178 (Akad Wissenschaft DDR) (May 2, 1985).

Data Base WPIL/Derwent AN-85-245675 (35), Derwent Publications Ltd., London, England, abstract of Japanese Patent No. JP-A-60160833 (Miyoshi Yushi KK) (Aug. 22, 1985).

"STELLAR Fat Replacer", a technical data sheet published by A. E. Staley Manufacturing Company, TDS 513 192250.

"STELLAR Fat Replacer; Structure", a technical information bulletin published by A. E. Staley Manufacturing Company, TIB 29 195060.

"STELLAR Fat Replacer; Handling, Storage, and Preparation", a technical information bulletin published by A. E. Staley Manufacturing Company, TIB 28 195060.

I. Larsson and A. Eliasson, "Annealing of Starch at an Intermediate Water Content", *Starch*, vol. 43, No. 6, pp. 227-231 (Jun. 1991).

FIG. 3

METHOD OF PREPARING A STARCH HYDROLYSATE, AN AQUEOUS STARCH HYDROLYSATE DISPERSION, METHOD OF PREPARING A FOOD CONTAINING A STARCH HYDROLYSATE, AND A FOOD FORMULATION CONTAINING A STARCH HYDROLYSATE

CROSS-REFERENCE TO RELATED APPLICATION

This application is a continuation-in part of U.S. application Ser. No. 07/746,432 filed Aug. 16, 1991, now abandoned, the disclosure of which is incorporated herein by reference. This application is also a continuation-in-part of U.S. application Ser. No. 07/908,728, filed Jul. 6, 1992, which was a continuation of U.S. application Ser. No. 07/578,994, filed Sep. 6, 1990, now abandoned, which was a continuation-in-part of U.S. application Ser. No. 07/483,208, filed Feb. 20, 1990, now abandoned.

FIELD OF THE INVENTION

This invention relates to food formulations in which at least a portion of the fat and/or oil is replaced by a carbohydrate.

BACKGROUND OF THE INVENTION

U.S. Pat. No. 4,510,166 (Lenchin et al.) discloses converted starches having a DE less than 5 and certain paste and gel characteristics which are used as a fat and/or oil replacement in various foods, including ice cream and mayonnaise. The converted starches are described as dextrins, acid-converted starches (fluidity starches), enzyme-converted starches and oxidized starches. It is also disclosed that if the converted starches are not rendered cold-water soluble by the conversion, they are pregelatinized prior to use or cooked during use.

A product bulletin entitled "Paselli SA2; The Natural Alternative to Fats and Oils" (AVEBE b.a., Foxhol, Holland, Ref. No. 05.12.31.167 EF)discloses the use of a low-DE-hydrolysate (DE less than 3) made from potato starch as a replacement for fifty percent of the fat with an amount of the low-DE-potato starch hydrolysate plus water (starch hydrolysate at 28% dry solids) equal to the amount of fat replaced.

U.S. Pat. Nos. 3,962,465 (Richter et al.) and 3,986,890 (Richter et al. ) disclose the use of thermoreversible gels of a starch hydrolysate (formed by enzymatic hydrolysis) as a substitute for fat in a variety of foods, including cake creams and fillings, mayonnaise and remoulades, cream cheeses and other cheese preparations, bread spreads, pastes, meat and sausage products, and whipped cream.

The preparation of ready-to-spread frostings having reduced levels of calories is disclosed in U.S. Pat. No. 4,761,292 (Augustine et al.). The patent discloses a frosting which contains (a) about 40 to 85 weight percent sugar, at least about 20 weight percent of which comprises fructose; (b) about 1 to 12 weight percent of a granular starch having a cold-water solubility of greater than 50 weight percent and a fat content of less than 0.25 weight percent; (c) about 5 to 30 weight percent fat; and (d) about 10 to 30 weight percent water. The patent also discloses, at column 5, lines 25-38, that the preferred frostings contain 8 to 18 weight percent fat in comparison to conventional frostings which routinely contain about 18 to 30 weight percent fat.

SUMMARY OF THE INVENTION

In one aspect, this invention relates to a method of preparing a starch hydrolysate comprising maintaining a strongly acidic aqueous slurry comprised of a granular amylose starch at a temperature greater than 70° C. and below both (i) the gelatinization temperature of said granular starch in said slurry and (ii) the atmospheric boiling point of said slurry, to hydrolyze a substantial portion of said granular starch and retain a starch hydrolysate residue insoluble in said strongly acidic aqueous slurry.

In preferred embodiments, said maintaining is effective to produce a slurry (when total slurry solids are 35% by weight) having a dextrose content of the supernatant phase of said slurry of at least about 0.5% by weight (as is) of the supernatant phase, more preferably from about 1% to about 2.5%, and said slurry is comprised of a strong acid at a concentration of at least about 0.2N (preferably at least about 0.4N) based upon the aqueous phase of said slurry.

"Insoluble in said strongly acidic aqueous slurry" means that solid starch hydrolysate which is recoverable from the slurry (optionally when neutralized) through isolation from the bulk of the liquid phase by mechanical means, e.g. by decantation, centrifugation, and/or filtration, and as opposed to evaporation of the liquid phase. By "gelatinization temperature" is meant the temperature at which a majority (by weight) of the granular starch starting material is "gelatinized" or "pasted" (e.g. as measured by DSC). In other words, a process in which the gelatinization occurs with respect to a minor amount of the granular starch starting material is within the scope of the moderate temperature process, unless otherwise noted.

This invention also relates to an aqueous dispersion comprising a minor amount by weight of a fragmented, granular, amylose starch hydrolysate and a major amount by weight of an aqueous liquid, said fragmented, granular, amylose starch hydrolysate, having a melting onset temperature (as measured by DSC) of at least 70° C. when measured at about 20% starch hydrolysate solids.

By "fragmented, granular, amylose starch hydrolysate" is meant a starch material comprised of amylose (and, optionally, amylopectin) and in granular form which has been subjected to acid hydrolysis followed by mechanical disintegration of the starch into fragments, a majority of which no longer exhibits the characteristic shape of the parent starch granule. The hydrolysis and disintegration will typically be sufficient to produce a hydrolysate which will form an aqueous dispersion at about 20% hydrolysate solids exhibiting a yield stress of from at least about 300 pascals, and preferably about 400 to about 3,000 pascals. The hydrolysis and fragmentation are accomplished at temperatures insufficient to gelatinize (or cook) said starch, and thus the fragments, after washing, are composed predominantly of insoluble starch hydrolysate products.

In another aspect, this invention relates to a method of formulating a food containing a fat and/or oil ingredient comprising replacing at least a substantial portion of said fat and/or oil ingredient with a fragmented, granular, amylose starch hydrolysate having a melting onset temperature (as measured by DSC) of at least 70°

C. when measured at about 20% starch hydrolysate solids.

In a related aspect, this invention relates to a food formulation having a reduced level of fat and/or oil comprising a mixture of a foodstuff and a fragmented, granular, amylose starch hydrolysate, having a melting onset temperature of at least 70° C. when measured at about 20% starch hydrolysate solids, as a replacement for at least a substantial portion of the fat and/or oil of said food formulation.

The terms "foodstuff" and "food", as used herein, are intended to broadly cover nutritional and/or functional materials that are ingested by humans in the course of consuming edible fare. The term "fats and/or oils" is intended to broadly cover edible lipids in general, specifically the fatty acid triglycerides commonly found in foods. The terms thus include solid fats, plastic shortenings, fluid oils, and the like. Common fatty triglycerides include cottonseed oil, soybean oil, corn oil, peanut oil, canola oil, sesame oil, palm oil, palm kernel oil, menhaden oil, whale oil, lard, and tallow (including partially hydrogenated forms thereof). The technology of fats and/or oils is described generally by T. H. Applewhite, "Fats and Fatty Oils", *Encyclopedia of Chemical Technology*, Vol. 9, pp. 795–831 (Kirk-Othmer, eds., John Wiley & Sons, Inc., New York, N.Y., 3d ed., 1980), the disclosure of which is incorporated by reference.

In another aspect, this invention relates to a method of pasteurizing a foodstuff comprising combining an aqueous dispersion of a fragmented, granular, amylose starch hydrolysate with a foodstuff material and heating said aqueous dispersion to a temperature of at least about 72° C. for a time sufficient to pasteurize said aqueous dispersion, said fragmented, granular, amylose starch having a melting onset temperature of at least 70° C. when measured at about 20% starch hydrolysate solids.

Pasteurization is described generally by C. M. Trout, "Pasteurization", *Encyclopedia of Food Science*, pp. 600–604 (M. S. Peterson and A. H. Johnson, eds., AVI Publ. Co., Westport, Connecticut, 1978), the disclosure of which is incorporated by reference. In general, high-temperature, short-time (HTST) techniques involve heating a composition to about 85° C. for about 1 sec., but dairy products, e.g. milk, are typically held at 71.1° C. for 15 sec. Trout, supra, at p. 602, recommends a sliding scale for neat ultrahigh temperature pasteurization in which the time of hold, e.g. 1.00 sec. at 88.3° C., is reduced as the pasteurization temperature is increased, e.g. 0.01 sec. at 100.0° C.

The use of the terms "major" and 37 minor" in context together in this specification is meant to imply that the major component is present in a greater amount by weight than the minor component, and no more nor less should be inferred therefrom unless expressly noted otherwise in context.

DETAILED DESCRIPTION OF THE INVENTION

Figure 1:
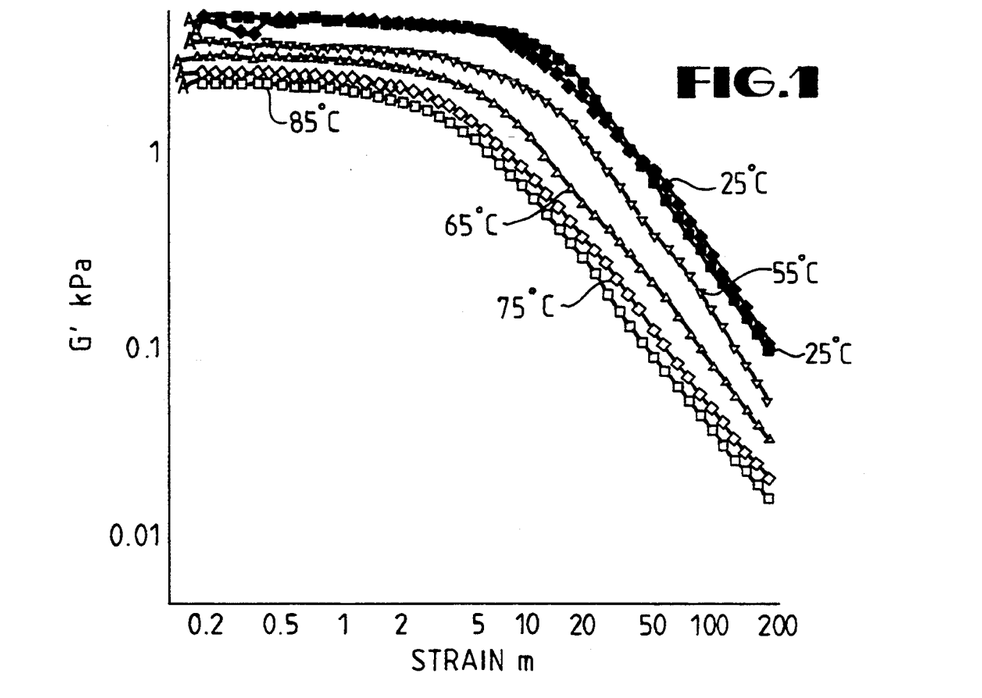
FIG. 1 shows the dynamic elastic modulus (G') in kilo pascals as a function of strain in millistrain for an aqueous dispersion of fragmented, granular, amylose starch hydrolysate after heating of the aqueous dispersion to the temperature indicated and holding at that temperature for the measurement of G'.
Figure 2:
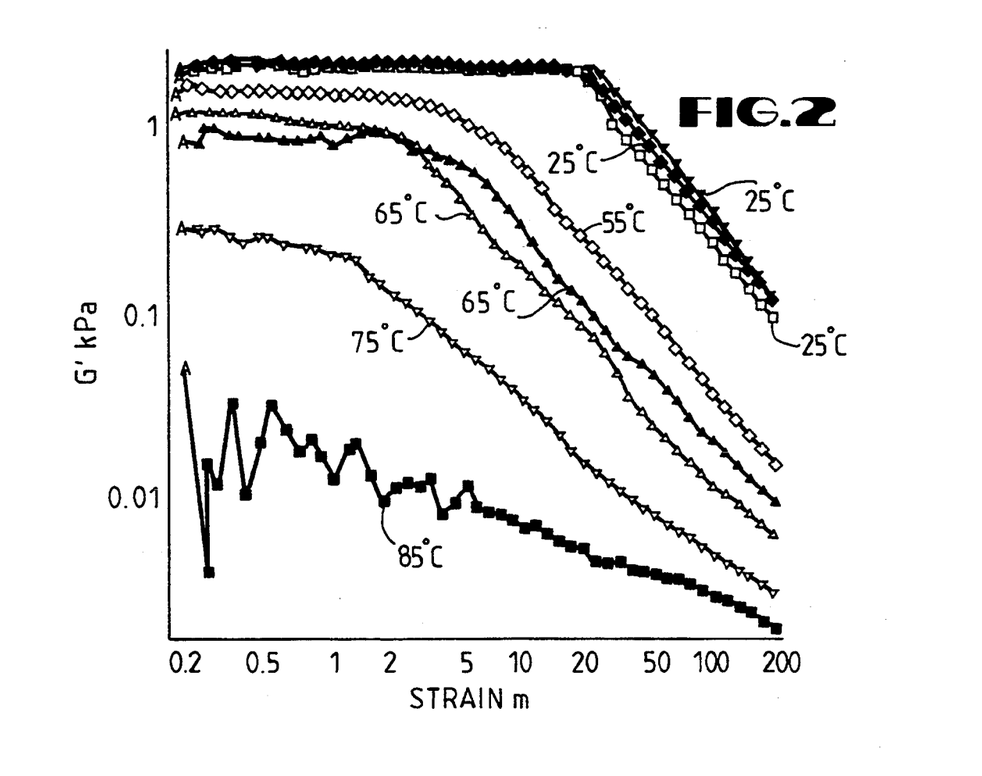
FIG. 2 shows the dynamic elastic modulus (G') in kilo pascals as a function of strain in millistrain for an aqueous dispersion of fragmented STELLAR TM starch hydrolysate after heating of the aqueous dispersion to the temperature indicated and holding at that temperature for the measurement of G'.
Figure 3:
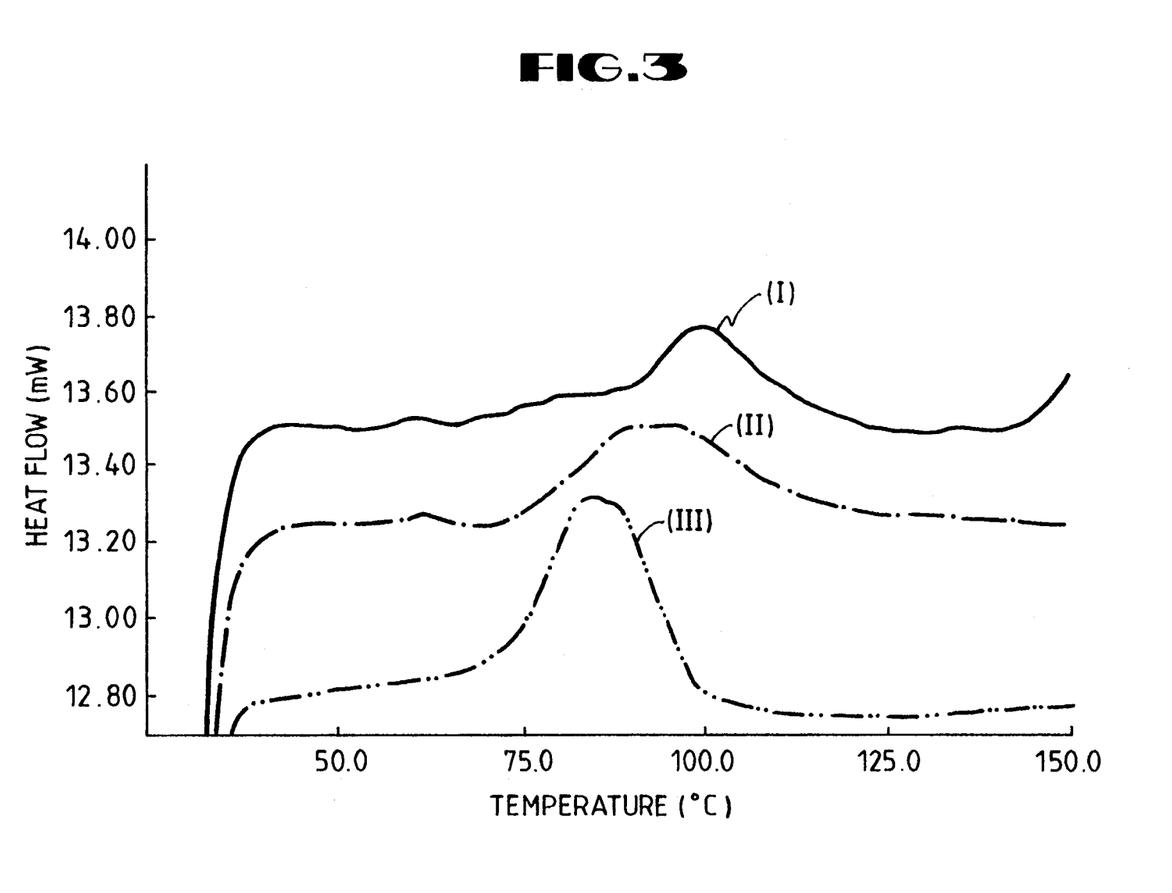
FIG. 3 shows the DSC curves for (i) an aqueous dispersion of fragmented, granular, high amylose corn starch produced substantially as described in Example 12, (ii) an aqueous dispersion of fragmented, granular, high amylose corn starch produced substantially as described in Example 12, but without the step of heating at 90° C., and (iii) an aqueous dispersion of fragmented, granular waxy corn starch available as STELLAR TM from A. E. Staley Manufacturing Company.

The fragmented, granular, amylose starch hydrolysate is made by the sequential acid-hydrolysis and fragmentation of a granular amylose starch material. Starch is generally comprised of a highly-branched glucan having alpha-1,4 and alpha-1,6 linkages, denominated amylopectin, and a substantially linear glucan, having almost exclusively alpha-1,4 linkages, denominated amylose. Methods of determining the amounts of each are referenced in R. L. Whistler et al., *Starch: Chemistry and Technology*, pp. 25–35 (Academic Press, Inc., New York, N.Y., 1984), tile disclosure of which is incorporated by reference. By an "amylose starch", it is meant that the starch will have a significant amylose content, as contrasted with waxy starch varieties such as waxy maize starch. Common (dent) corn starch typically has an amylose content of about 28%. Starches preferred for use herein will have an amylose content of greater than about 40% by weight. Such preferred starches can be referred to as "high amylose" starches.

Examples of starches having a major proportion of amylose (i.e. greater than about 50% by weight amylose) include high amylose corn starch which is commercially available in native granular form and having an amylose content within the range of about 50% to about 80%. For example, native granular starches, two with an amylose content of 55% to 60% and another with about 70%, are available from National Starch and Chemical Corporation, Bridgewater, N.J., as HI-SET® C or HYLON TM and HYLON TM VII, respectively.

The starch should be in the native granular form to be useful as a starting material. This form is resistant to hydration and/or gelatinization during the acid-hydrolysis, and thus, fragments of the starch will retain many of the structural features of the native granule, e.g. the lamellae resulting from the growth pattern of the granule. The crystalline form of the parent starch, as determined by X-ray diffraction, is retained without substantial change, although the relative crystallinity of the starch hydrolysate is generally greater than the parent starch. Thus, native high amylose corn starch which is of the "B" type crystalline form will generally yield hydrolysates that are of the "B" type as determined by X-ray diffraction.

Various pretreatments of the native granular starting material can be performed so long as the resistance to gelatinization during acid-hydrolysis is preserved. A particularly useful pretreatment is defatting and/or deflavoring of the granule, e.g. by an alkaline wash as described in U.S. Pat. No. 4,477,480 (Seidel et al.), the disclosure of which is incorporated herein by reference, and/or a solvent extraction as described in U.S. Pat. Nos. 3,717,475 and 3,586,536 (Germino), the disclosures of which are incorporated by reference. The granular starch from which the hydrolysate is made should generally contain less than about 1.5% fatty acids and proteins. Because the hydrolysis is accomplished in a predominantly aqueous medium and is typically washed with only water, the hydrolysis typically will not remove a substantial portion of the lipids present in the starch. Further, because a substantial portion of the starch is hydrolyzed to products soluble in the aqueous medium and subsequent wash water, the hydrolysis and washing will remove starch solids and, thus, result in a lipid content on a weight percentage basis that is higher for the hydrolysate than the parent starch.

The acid-hydrolysis of the granular starch is performed to permit mechanical disintegration of the granular starch hydrolysate residue to a degree that will allow the formation of an aqueous dispersion that is salve-like. The hydrolysate will be capable upon mechanical disintegration of forming an aqueous dispersion (at about 20% hydrolysate solids) having a yield stress of from about 100 to about 3,000 pascals (preferably, from about 400 to about 2,000 pascals).

The yield stress of an aqueous dispersion of fragmented starch hydrolysate has been found to correlate well with the fat-like consistency of the aqueous dispersion. In other words, if the yield stress is in an appropriate range, the aqueous dispersion will generally exhibit a fat-like consistency. However, yield stress may not correlate well with properties other- than consistency. For example, a sample with an appropriate yield stress may exhibit a gritty mouthfeel (i.e. grittiness) due to aggregation of the insoluble hydrolysate particles (e.g. as a result of freeze-thaw of an aqueous dispersion of fragmented starch hydrolysate). Further, the correlation between yield stress and fat-like consistency may not hold in the converse for all fragmented starch hydrolysates described herein. In other words, a particular fragmented starch hydrolysate may exhibit a fat-like consistency under some conditions, but not exhibit an appropriate yield stress. In sum, while yield stress exhibits a useful correlation with fat-like consistency, yield stress is not believed to be a perfect predictor of fat mimicking properties of a fragmented starch hydrolysate.

It has been found that the weight average molecular weight ($M_w$) of the starch hydrolysate as measured by gel permeation chromatography should generally range from about 3,000 to about 12,000, preferably from about 5,500 to about 10,000. Molecular weights of starch hydrolysates can be measured by the procedure described by J. Bouchard et al., "High-Performance Liquid Chromatographic Monitoring of Carbohydrate Fractions in Partially Hydrolyzed Corn Starch", *J. Agric. Food Chem.*, Vol. 36, pp. 1188–1192 (1988), the disclosure of which is incorporated herein by reference.

The starch hydrolysates, and fragmented dispersions thereof, can be analyzed by a variety of techniques. For example, low angle (or "small angle") X-ray scattering experiments can be performed on an aqueous dispersion of a fragmented starch hydrolysate and the results (particularly those in and near the Porod region of the spectrum) may show an ordering (or lack thereof) in the dispersion in the range of tens to hundreds of angstroms. Such low-angle X-ray scattering techniques are described in F. Reuther et al., "Structure of Maltodextrin Gels—A Small Angle X-Ray Scattering Study", *colloid and Polymer Science*, 261, 271–276 (1983), the disclosure of which is incorporated by reference. Further, wide angle X-ray scattering techniques (e.g. those described by S. Nara et al., "Study on Relative Crystallinity of Moist Potato Starch", Starke/Starch, Vol. 30, pp. 111–114 (1978)) can be performed on the starting starch, the starch hydrolysate powder and on the aqueous dispersion of fragmented starch hydrolysate to examine the effects of hydrolysis and/or fragmentation on the ordering of the starch material in the range of about 1–15 angstroms, i.e. ordering related to the distances between atoms in the starch material.

Nuclear magnetic resonance techniques (e.g. those described by S. Richardson, "Molecular Mobilities of Instant Starch Gels Determined by Oxygen-17 and Carbon-13 Nuclear Magnetic Resonance", *Journal of Food Science*, Vol. 53, No. 4, pp. 1175–1180 (1988)) can be used to show the electronic environment of atomic nuclei in the starch hydrolysate, e.g. carbon-13 and thus give information relating to molecular structure and disposition (e.g. carbohydrate ring conformations, Vander Waals bonding, etc. ). The technique of measuring water mobility (or immobility, its inverse) by oxygen-17 NMR may be supplemented with Raman infra-red spectroscopy techniques in the "water-band" of the infrared portion of the spectrum (e.g. techniques such as those described by C. Luu, et al., "Model Structure for Liquid Water", *Travaux de la Societe de Pharmacie de Montpellier*, Vol. 41, No. 3, pp. 203–212 (1981), the disclosure of which is incorporated herein by reference). Differential Scanning Calorimetry (DSC) can be employed to examine the solubility of the starch hydrolysate in water (before and/or after- fragmentation) over various temperatures. Such DSC techniques are described, for example, by D. C. White and G. N. Lauer, "Predicting Gelatinization Temperatures of Starch/Sweetener Systems for Cake Formulation by Differential Scanning Calorimetry. I. Development of a Model", Cereal Foods World, Vol. 35, No. 8, pp. 728–731 (August 1990), the disclosure of which is incorporated by reference.

It should also be noted that the mean particle size of the starch hydrolysate, before and after fragmentation, can be measured by a variety of different means. However, the utility of such information must be considered carefully in view of the considerations noted by C. Orr, "Particle Size Measurement", Encyclopedia of *Chemical Technology*, Vol. 21, pp. 106–131 (Kirk-Othmer, eds., John Wiley & Sons, Inc., New York, N.Y., 1983), the disclosure of which is incorporated by reference. With this caveat in mind, it should be mentioned that the mean particle size, as measured by certain techniques, of the starch hydrolysate may appear to be substantially the same, e.g. about 10 microns (by light scattering techniques). However, when the aqueous dispersion of fragmented starch hydrolysate is analyzed (e.g. by gas adsorption of fragmented starch dispersions that were solvent exchanged and dried) to determine tile surface area of the fragments, a mean particle size on the order of 200 angstroms may be inferred therefrom. Without wishing to be bound by any particular theory, unless otherwise noted, this particle size information suggests that the aqueous dispersion of fragmented starch hydrolysate contains agglomerates of fragments, such agglomerates being on the order of 10 microns in size and being comprised of individual fragments on the order of 200 angstroms. Further, it may be theorized that the agglomerates are malleable in the dispersion such that they deform (and perhaps undergo interagglomerate exchange of fragments) in a manner that imparts the property of plasticity to the dispersion. This plasticity may then give rise to the fat-like or salve-like consistency of the dispersion. This theory may also account for the fat-like mouth-clearing of the dispersion observed in many foods, e.g. frozen desserts. However, it should again be noted that these theories must be considered as such, unless otherwise expressly noted herein.

Other theological measurements can be made to determine the rheological characteristics of the fragmented dispersion. Typically, the aqueous dispersion of fragmented starch particles will exhibit a transition in dynamic elastic modulus (G') versus shear strain at less than about 50 millistrain, and preferably less than about 10 millistrain, said transition being from a substantially constant G' versus shear strain to a decreasing G' versus shear strain. The transition indicates fracture of the particle network within the particle gel and is typically a sharp transition.

The acid hydrolysis can be accomplished in an essentially aqueous slurry of the starch. Typical conditions will include a starch slurry at 30% to 40% starch solids in 0.2N to 2.5N mineral acid (e.g. hydrochloric acid or sulfuric acid) maintained at a temperature of from just greater than 70° C. to about 100° C., preferably from about 75° C. to about 95° C., for a period of time sufficient to give an insoluble hydrolysate which fragments readily, e.g. from about ¼ hour to about 5 hours, when the acid is present in the aqueous phase of the slurry at about 0.5N. Variations within and around the scope of these parameters to optimize a particular set of conditions in conjunction with the means and degree of mechanical disintegration described below will be within the skill of the art given the examples set forth below.

If the amylose starch chosen as a starting material is relatively low in amylose content, e.g. less than 40% amylose, it may be necessary to stage the hydrolysis reaction. This staging will involve an initial hydrolysis period at less than 70° C., e.g. at 60°, for a time sufficient to hydrolyze and leach from the starch granules a significant amount of amorphous and low melting starch. The initial hydrolysis period is then followed by a second hydrolysis period during which the temperature of the reaction slurry is maintained above 70° C. The starch hydrolysate from the initial period can be isolated from the reaction slurry and then reslurried for the second hydrolysis period, but there is no need for such isolation between the stages. This staging will allow the maintenance of the starch in a granular form, albeit with weakened granules susceptible to fragmentation.

As an alternative to hydrolysis at above 70° C., the starch can be hydrolyzed at temperatures below 70° C. and then heated, in aqueous slurry at a substantially neutral pH, to a temperature above 70° C. for a time sufficient to raise the melting onset temperature to at least 70° C when measured at 20% starch hydrolysate solids. The starch hydrolysate can be isolated from the reaction slurry and reslurried for such treatment or the reaction slurry, after neutralization, can simply be heated above 70° C. Such heat treatment will typically involve holding a slurry comprised of a major amount of water and a minor amount of starch hydrolysate at a substantially neutral pH, e.g. a pH of about 3–8, preferably about 4–5, and at a temperature between about 75° C. and about 95° C. for about ½ hour to about 3 hours. The resulting starch hydrolysate can then be isolated as described more fully below.

The hydrolysis medium is essentially aqueous. Generally, it will contain no more than a trace, if any, of organic solvents (e.g. ethanol). Organic solvents may react with the saccharide by-products (e.g. dextrose to form at least traces of ethyl glucoside), may otherwise affect the hydrolysis reaction (e.g. solvent effects) and/or may contaminate the starch hydrolysate product.

The progress of the hydrolysis may be followed by taking small samples of slurry from an in-progress batch of the starch hydrolysate, adjusting the pH of the slurry (e.g. to 4–5), isolating the solid starch hydrolysate residue from the slurry sample, and mechanically disintegrating the residue under the conditions intended for the batch as a whole. The yield stress of a 20% aqueous dispersion can then be measured to determine if the acid-hydrolysis has progressed to a desired degree. Also, samples of insoluble residue can be isolated for a determination of peak molecular weight (or weight average molecular weight) by gel permeation chromatography or of supernatant for dextrose content and the results used as a measure of the degree of hydrolysis; both molecular weight (particularly $M_w$) and dextrose content should correlate well with yield stress of the resulting starch hydrolysate upon fragmentation for a given set of reaction conditions (i.e. acid concentration, starch solids concentration, and hydrolysis time and temperature).

The starch hydrolysis product of the slurry is isolated as the solid phase residue by separation thereof from the aqueous phase of the slurry. Techniques for such isolation include filtration (e.g. horizontal belt filtering), centrifugation (e.g. disk, decanter or solid bowl), sedimentation, and other suitable dewatering operation. It may be advantageous to maintain the slurry at an elevated temperature (e.g. 70° to 90° C.) during isolation. It should be noted that a solid bowl centrifuge has been found to be one of two most practical means of isolating the solid phase residue by sedimentation.

The principles and modes of operation of imperforate bowl centrifuges are described by A. C. Lavanchy and F. W. Keith, "Centrifugal Separation", *Encyclopedia of Chemical Technology*, Vol. 5, pp. 194–233 (Kirk-Othmer, eds., John Wiley & Sons, Inc., New York, N.Y., 3d ed., 1979) and P. A. Schweitzer, *Handbook of Separation Techniques for Chemical Engineers*, pp. 4–60 to 4–88 (McGraw Hill, New York, N.Y., 1988), the disclosures of each of which are incorporated herein. (It should be noted that Schweitzer uses the term "Solid-Wall Basket Centrifuge".)

Such techniques may be facilitated by the addition to the slurry of a water-miscible organic solvent. By "water-miscible organic solvent" is meant a solvent which will mix with water to form an aqueous/organic phase containing a major amount (by weight) of such organic solvent. Selection of a precise organic solvent to water ratio will depend on the precise centrifugation and efficiency of the filtration equipment used. The organic solvent should be a food grade material, i.e. the residue, if any, of such solvent, after drying of the solid material collected by filtration, should be edible, i.e. fit for human consumption.

Examples of suitable solvents include the lower alkanols (e.g. ethanol, isopropanol and mixtures thereof); lower aliphatic esters (e.g. ethyl acetate); lower aliphatic ketones (e.g. acetone); and glycols (e.g. 1,3-butylene glycol).

it has been found that microfiltration is an effective means of separating an insoluble starch hydrolysate residue from an aqueous slurry thereof which also contains a relatively large amount of dissolved species, e.g. salt and saccharides. Microfiltration is described generally in D. R. Paul and C. Morel, "Membrane Technology", *Encyclopedia of Chemical Technology*, Vol. 15, pp. 92–131 (Kirk-Othmer, eds., John Wiley & Sons, Inc., New York, N.Y., 3d ed., 1981), the disclosure of which is incorporated herein by reference.

Typically, a liquid including small dissolved molecules is forced through a porous membrane. Large dissolved molecules, colloids and suspended solids that cannot pass through the pores are retained. Components retained by the membrane are collectively referred to as a concentrate or retentate. Components which traverse the membrane are referred to collectively as filtrate or permeate. Diafiltration is a microfiltration process in which the retentate is further purified or the permeable solids are extracted further by the addition of water to the retentate. This process is analagous to washing of a conventional filter cake. The use of microfiltration removes salts formed by the neutralization of the alkaline solution and other small molecular species.

Ultrafiltration is generally described and discussed by P. R. Klinkowski, "Ultrafiltration", *Encyclopedia of Chemical Technology*, Vol. 23, pp. 439–461 (Kirk-Othmer, eds., John Wiley s Sons, New York, N.Y., 3d ed., 1983), the disclosure of which incorporated by reference herein. Ultrafiltration is a pressure-driven filtration on a molecular scale. The porous membrane typically has a pore size ranging from 0.005 to 20 micrometers (or microns). While a distinction is often made in the separation art between ultrafiltration [pore size range of 2 to 20 nanometers) and microfiltration (pore size greater than 20 nanometers), the terms will be used interchangeably herein unless expressly noted otherwise.

The acid in the slurry can be neutralized either before or after isolation of the hydrolysate. Any food grade alkali [e.g. sodium hydroxide, soda ash, potassium hydroxide, etc.) can be used to neutralize the slurry, preferably to a pH of from about 4 to about 5. However, it may be advantageous (in terms of obtaining a desirably bland flavor for the hydrolysate) to (i) only partially neutralize the slurry to a weakly acidic pH (e.g. from about 2.0 to about 3.5) and (ii) then hold the slurry at a moderately elevated temperature [e.g. minutes to 24 hours), prior to isolation, followed by washing and then neutralization of the solid hydrolysate residue to a substantially neutral pH (e.g. about 4.5 to about 5.0). This acid washing of the starch hydrolysate is particularly advantageous when employed in the context of microfiltration of the starch hydrolysate slurry using a ceramic microfiltration membrane contained within an acid resistant (e.g. polyvinyl chloride) housing.

By "microporous ceramic membrane" is meant any ceramic layer (including "supported layer articles") having micropores and sufficient structural integrity to withstand the pressure needed to isolate the insoluble starch hydrolysate residue from the liquid phase of the aqueous slurry over a desired period of time (e.g. from 15 minutes to 24 hours). It is believed that the high pressure used to isolate the insoluble starch hydrolysate residue creates turbulent flow at the membrane's surface which prevents small particles in the slurry from "blinding off" the pores of the membrane (as has been observed with conventional filtration equipment as discussed below.

A typical microporous ceramic membrane is comprised of a microporous ceramic article having at least one macroscopic passage therethrough (typically a cylindrical article having cylindrical passages) substantially parallel to the axis of symmetry of the cylindrical article. While the article may be "microporous" itself, the ceramic cylinder may act principally as a support (i.e. in a "supported layer article") for a microporous layer (or layers with regard to multi-passage articles) which covers the surfaces defined by the passages through the ceramic article. The porosity of the ceramic article, and any microporous layer associated therewith as described above, can be varied as desired, with the pore size of any such layer being smaller than that of the article. In typical operation, such a ceramic filter element (i.e. cylindrical and microporous ceramic article) is contained in hollow cylindrical housing and slurry is fed into the passages under pressure through a feed manifold that prevents leakage into the housing. The exit of the isolated starch hydrolysate residue from the passages at the other end of the ceramic filter element is controlled by an exit manifold which also prevents leakage into the housing where the filtrate or permeate is contained. Ceramic filter elements and their use are described in "Solve Tough Process Filtration Problems with Ceraflo Ceramic Systems", a technical bulletin, Lit. No. SD113, 2/89 89–418, published (1989) by Millipore Corporation, Bedford, Mass., the disclosure of which is incorporated by reference.

The isolated starch hydrolysate is typically washed and then dried (e.g. to a low moisture content, typically 3–8%) after isolation to allow for handling and storage prior to further processing. Examples of drying techniques include spray drying, flash drying, tray drying, belt drying, and sonic drying. The dried hydrolysate may be hygroscopic, given the presence of the cold-water soluble hydrolysate therein. Thus, some rehydration during handling and storage may occur. Depending upon the precise composition of the hydrolysate and the conditions (including length of time) of storage, steps to maintain the moisture at a low content may be necessary (e.g. moisture barrier packaging and/or control of humidity in the storage environment). If the moisture content is allowed to rise too far (e.g. greater than about 20% or possibly greater than 15%), bulk handling problems and/or microbiological stability problems might arise.

The fragmented starch hydrolysate may also be otherwise chemically modified. Examples of such chemical modification include tile product of reaction with bleaching agents (e.g. hydrogen peroxide, peracetic acid, ammonium persulfate, chlorine (e.g. calcium and-/or sodium hypochlorite or sodium chlorite), and permanganate (e.g. potassium permanganate) ); esterifying agents (e.g. acetic anhydride, adipic anhydride, octenyl succinic anhydrides, succinic anhydride, vinyl acetate); including phosphorous compounds (e.g. monosodium orthophosphate, phosphorous oxychloride, sodium tripolyphosphate, and sodium trimetaphosphate); and/or etherifying agents (e.g. acrolein, epichlorohydrin, and-/or propylene oxide). Such chemical modifications will typically be accomplished after the acid hydrolysis step, but may be accomplished prior to the acid hydrolysis or effected by using a modified starch as a starting material for the acid hydrolysis step. Even esterified starches (e.g. starch modified with octenyl succinic anhydride)

can be used as a starting material and significant ester functionality will be retained.

Following acid-hydrolysis (and neutralization of the slurry), the granular starch hydrolysate is subjected to a physical fragmentation as by mechanical disintegration, i.e. fragmented. As used herein, "fragmented" means that a majority of the starch granules have been so fragmented that they no longer exhibit, under microscopic examination, the macro-organization of the granule, e.g. the shape characteristic of that variety of granule. Generally, the concentric shells of material that are observed in the granule after the hydrolysis are not observed in a majority of the granules after fragmentation. However, the native crystallites present in the granule are retained (as confirmed by X-ray diffraction of the salves).

The mechanical disintegration of the hydrolysate may be carried out in several ways, as by subjecting it to attrition in a mill, or to a high speed shearing action, or to the action of high pressures. Disintegration is generally carried out in the presence of a major amount by weight of a liquid medium, preferably water. Although tap water is the preferred liquid medium for the dispersion of fragmented starch hydrolysate, other liquids are suitable provided sufficient water is present to hydrate the fragmented starch hydrolysate and, thus, result in a dispersion having a suitable yield stress. Sugar solutions, polyols, of which glycerol is an example, alcohols, particularly ethanol, isopropanol, and the like, are good examples of suitable liquids that can be in admixture with water in the liquid medium. It may also be convenient to fragment the starch hydrolysate in a non-hydrating medium (e.g. 95% ethanol), then solvent exchange with water, and finally redisperse the fragmented starch hydrolysate to form an aqueous dispersion. Typically, however, the starch hydrolysate will be physically fragmented in potable water.

The mechanical disintegration is preferably accomplished by subjecting an aqueous dispersion of the hydrolysate to high shear, e.g. in a Waring blender or a homogenizer such as that disclosed in U.S. Pat. No. 4,533,254 (Cook et al.) and commercially available as a MICROFLUIDIZER TM from Microfluidics Corporation, Newton, Mass., or a homogenizer such as the RANNIE TM high pressure laboratory homogenizer, Model Mini-lab, type 8.30H, APV Rannie, Minneapolis, Minn. Homogenizers useful in forming suspensions or emulsions are described generally by H. Reuter, "Homogenization", *Encyclopedia of Food Science*, pp. 374–376, (M. S. Peterson and A. H. Johnson, eds., AVI Publ. Co., Westport, Connecticut, 1978), L. H. Rees and W. D. Pandolfe, "Homogenizers", *Encyclopedia of Food Engineering*, pp. 467–472 (C. W. Hall et al., eds., AVI Publ. Co., Westport, Connecticut, 1986), and W. C. Griffin, "Emulsions", *Encyclopedia of Chemical Technology*, vol. 8, pp. 900–930 (Kirk-Othmer eds., John Wiley F, Sons, Inc., New York, N.Y., 3d ed., 1979), the disclosures of which are incorporated herein by reference.

The temperature of the starch hydrolysate must be maintained below the gelatinization (i.e. solubilization) temperature of the hydrolysate. Thus, it may be necessary to cool the hydrolysate during disintegration. Whatever method is used, the disintegration is carried out to such an extent that the resulting finely-divided product is characterized by its ability to form a salve-like suspension in the liquid medium in which it is attrited or in which it is subsequently dispersed. By a salve-like suspension or dispersion is meant one which will exhibit, at about 20% hydrolysate solids, a yield stress of at least about 100 pascals, typically from about 100 pascals to about 3,000 pascals.

It should be noted that it has been found that an aqueous dispersion of the hydrolysate generally exhibits an increase in viscosity over a period of hours following the mechanical disintegration. Thus, the yield stress values herein denote the yield stress about three hours after mechanical disintegration unless otherwise noted. It should also be noted that mechanical disintegration may be sufficient to produce an aqueous dispersion having the desired yield stress, but still leave a sufficient number of particles of sufficient size to exhibit a "particulate" or "chalky" mouthfeel when ingested. Such chalkiness can be reduced by reducing the particle size of the starch hydrolysate before, during or after mechanical disintegration so that substantially all-(typically at least about 95%, preferably at least 99%) of the hydrolysate will pass a U.S. #325 mesh sieve (i.e. substantially all particles are less than 45 microns). An example of a milling device suitable for such size reduction is a TROST TM Air Impact Mill from Garlock, Inc., Newton, Pa.

It has further been found that the use of a homogenizer as disclosed in U.S. Pat. No. 4,533,254 is facilitated by the addition of a small amount (e.g. 5% by weight of the starch hydrolysate dry solids) of an emulsifier to the aqueous slurry of starch hydrolysate fed to the homogenizer. When relatively high solids slurries of starch hydrolysate are fed into the homogenizer without added emulsifier, the homogenizer may tend to plug after extended operation. The addition of emulsifier (for example, a mixture of mono- and all-fatty acid glycerides, e.g. DUR-LO TM emulsifier from Van Den Bergh Foods) prevents this plugging of the homogenizer. Other emulsifiers include polyglycerol esters, polysorbates, ethoxylated monoglycerides, sorbitan monostearate, lactylated esters, and lecithin.

The use of the fragmented, granular, amylose starch hydrolysate allows for the replacement of a substantial portion (e.g. from 10% to 100% by weight) of the fat and/or oil in a food formulation. The precise level of replacement that is possible without significantly decreasing the organoleptic quality of the food will generally vary with the type of food. For example, in a French-style salad dressing, it is generally possible to completely replace the oil component that is normally present. In other types of foods, e.g. frostings, icings, cream fillings, ice cream, margarine, etc., a major amount of the fat and/or oil (e.g. about 50% to about 80%) can be replaced with little effect on the organoleptic desirability of the food. Examples of typical foods in which fat and/or oil can be replaced include frostings (e.g. icings, glazes, etc. ), creme fillings, frozen desserts (e.g. ice milk, sherbets, etc. ), dressings (e.g. pourable or spoonable salad and/or sandwich dressings), meat products (e.g. sausages, processed meats, etc.), cheese products (e.g. cheese spreads, processed cheese foods), margarine, fruit butters, other imitation dairy products, puddings (e.g. mousse desserts), candy (e.g. chocolates, nougats, etc.), and sauces, toppings, syrups and so on.

Generally, it will be desirable to remove sufficient fat from a given food formulation to achieve a reduction in calories of at least one-third per customary serving or make a label claim of "cholesterol-free". (in this regard, see, for example, the list of standard serving sizes for various foods published in Food Labelling; Serving Sizes, 55 Fed. Reg. 29517 (1990) (to be codified at 21 C.F.R. 101.12), the disclosure of which is incorporated herein by reference, and the restrictions on labelling "cholesterol-free" at Food Labelling; Definitions of the Terms Cholesterol Free, Low Cholesterol and Reduced Cholesterol, 55 Fed. Reg. 29456 (1990)). It should also be noted that the fat removed from a particular formulation may be replaced with an equal amount by weight of an aqueous dispersion of fragmented starch hydrolysate, but that such equality may not be necessary or desirable in all instances. Further, it may be desirable to remove fat and add another ingredient (e.g. a gum, polydextrose, a protein, etc.) along with the aqueous dispersion of starch hydrolysate.

While this invention is generally directed to the replacement of fat and/or oil in a food formulation, it is of course within the contemplation of this invention that a fragmented, granular, amylose starch hydrolysate will be used in an entirely new formulation to which it contributes fat-like organoleptic qualities but is not, in the strictest sense, replacing a pre-existing fat or oil ingredient. Moreover, it is contemplated that the fragmented, granular, amylose starch hydrolysate will have utility as a thickener, bodying agent, or the like in foods that normally do not have a significant fat or oil component.

In general, the fragmented, granular, amylose starch hydrolysate is incorporated into the food as an aqueous dispersion, typically comprised of a major amount (i.e. greater than 50% by weight) of water or other liquid medium and a minor amount (i.e. less than 50% by weight, typically 10% to 40%) of starch hydrolysate solids. Alternatively, the isolated hydrolysis product can be mixed with the food along with water and then subjected to disintegration in those instances when the other ingredients of the food are capable of withstanding the condition of disintegration, e.g. a salad dressing or imitation sour-cream.

It is contemplated that commercial production and use may involve hydrolysis, mechanical disintegration, and drying (e.g. spray drying) of the fragmented starch hydrolysate to produce an item of commerce. This item of commerce will then be purchased by a food processor for use as an ingredient. To incorporate the dried, fragmented, granular starch hydrolysate into a food product, it may be useful and/or necessary to further mechanically disintegrate the starch hydrolysate while dispersing it into the foodstuff in which it will be employed. However, the techniques employed for such mechanical disintegration should not need to be nearly as vigorous as the original mechanical disintegration prior to drying.

The fragmented, granular, amylose starch hydrolysate should not be subjected to conditions (e.g. elevated temperature) which will cause the hydrolysate fragments (i.e. a majority by weight thereof) to dissolve. Thus, if the food formulation is to be cooked or otherwise heated, to temperatures sufficient to gelatinize (i.e. dissolve) the hydrolysate, such heating should be completed prior to the addition of the hydrolysate to the food. It should be noted, however, that in many foods that are cooked, e.g. cheesecake, the internal temperature and/or moisture availability may be insufficient to dissolve the starch hydrolysate fragments.

As noted above, the terms "food" and "foodstuffs" are intended broadly, as relating to both nutritional and/or functional food ingredients. It is contemplated that one or more food ingredients may be mixed with the aqueous dispersion of fragmented, granular, amylose starch hydrolysate, or even dry mixed with the amylose starch hydrolysate prior to mechanical disintegration.

Among the food ingredients in the food formulations of this invention include flavors, thickeners (e.g. starches and hydrophilic colloids), nutrients (e.g. carbohydrates, proteins, lipids, etc.), antioxidants, antimicrobial agents, non-fat milk solids, egg solids, acidulants, and so on.

Hydrophilic colloids can include natural gum material such as xanthan gum, gum tragacanth, locust bean gum, guar gum, algin, alginates, gelatin, Irish moss, pectin, gum arabic, gum ghatti, gum karaya and plant hemicelluloses, e.g. corn hull gum. Synthetic gums such as water-soluble salts of carboxymethyl cellulose can also be used. Starches can also be added to the food. Examples of suitable starches include corn, waxy maize, wheat, rice, potato, and tapioca starches.

Non-fat milk solids which can be used in the compositions of this invention are the solids of skim milk and include proteins, mineral matter and milk sugar. Other proteins such as casein, sodium caseinate, calcium caseinate, modified casein, sweet dairy whey, modified whey, and whey protein concentrate can also be used herein.

For many foods, it is accepted practice for the user to add the required amount of eggs in the course of preparation and this practice may be followed just as well herein. If desired, however, the inclusion of egg solids, in particular, egg albumen and dried yolk, in the food are allowable alternatives. Soy isolates may also be used herein in place of the egg albumen.

Dry or liquid flavoring agents may be added to the formulation. These include cocoa, vanilla, chocolate, coconut, peppermint, pineapple, cherry, nuts, spices, salts, flavor enhancers, among others.

Acidulants commonly added to foods include lactic acid, citric acid, tartaric acid, malic acid, acetic acid, phosphoric acid, and hydrochloric acid.

Generally, the other components of the various types of food formulations will be conventional, although precise amounts of individual components and the presence of some of the conventional components may well be unconventional in a given formulation. For example, the conventional other components for foods such as frozen desserts and dressings, are described in European Patent Publication No. 0 340 035, published Nov. 2, 1989, (the pertinent disclosure of which is incorporated herein by reference) and the components and processing of table spreads is disclosed in U.S. Pat. No. 4,869,919 (Lowery), the disclosure of which is incorporated by reference.

A particularly advantageous use of the fragmented starch hydrolysates described herein may be the use thereof to replace a portion of the shortening used in a layered pastry article. In layered pastry articles (Danish, croissants, etc.) layers of a bread dough are assembled with a "roll-in" placed between the layers. The roll-in commonly contains a "shortening" (i.e. a fat and/or oil component) from an animal (e.g. butter) or vegetable (e.g. partially hydrogenated soybean oil) source. The assembled article, optionally containing a filling or topping, is then baked to form a finished pastry.

The following examples will illustrate the invention and variations thereof within the scope and spirit of the invention will be apparent therefrom. All parts, percentages, ratios and the like are by weight throughout this specification and the appended claims, unless otherwise noted in context.

EXAMPLES

EXAMPLES 1–4

High amylose starch (nominal 55% amylose, HI-SET C) (1395.3 grams, 1200 grams dry basis) was slurried in 1964.1 grams of water. The slurry was heated in a 80° C. water bath and 109.73 grams of concentrated hydrochloric acid was added. Samples of the slurry were taken from the reaction vessel at 1, 2, 3 and 4 hour intervals and were neutralized by adding a 14% $Na_2CO_3$ solution to pH 4.5. Samples were centrifuged, the residues reslurried in water and again centrifuged. The residue was again reslurried and centrifuged. After drying the residue, the yield of product as a percent of total carbohydrate solids in the reaction slurry was measured. The yield stress and melting onset temperature (by DSC) of a 20% solids microfluidized creme were determined. The weight average molecular weight, % ash and % cold water solubles of the dry product were measured. The % insoluble product in the slurry prior to separation (% Insoluble in Table 1 below) was also measured. The results are shown in Table 1, below.

EXAMPLES 5–7

The reaction of Examples 1–4 was repeated using a 70° C. water bath. Samples were taken at 3 ½, 6 and 8 hours of reaction, and were treated as in Examples 1–4. The results are shown in Table 1, below.

EXAMPLES 8 and 9

The reaction of Examples 1–4 was repeated using a 70° C. water bath. Samples were taken at 9 and 11 hours of reaction and were treated as in Examples 1–4. The results are shown in Table 1, below.

TABLE 1

| Example No. | Run Time (hrs.) | Yield Stress (pascals) | Mw (g/mol) | CWS (wt. %) | Ash (wt. %) | Insolubles (wt. %) | Yield (wt. %) | DSC Onset (°C.) |
|---|---|---|---|---|---|---|---|---|
| 1 | 1 | 650 | 10,047 | 7.3 | 0.15 | — | 56.6 | 79.174 |
| 2 | 2 | 1,319 | 7,312 | 9.0 | 0.23 | — | 40.6 | 80.631 |
| 3 | 3 | 1,350 | 6,337 | 9.7 | — | — | 34.2 | 81.128 |
| 4 | 4 | >1,700 | 5,799 | 8.5 | — | — | 29.7 | 89.446 |
| 5 | 3.5 | 29 | 11,594 | 13.7 | 0.79 | 65.64 | 60.21 | 79.430 |
| 6 | 6 | 197 | 7,709 | 18.0 | 1.37 | 52.07 | 58.40 | 73.842 |
| 7 | 8 | 573 | 7,100 | 16.8 | 2.25 | 45.56 | 59.20 | 73.978 |
| 8 | 9 | 619 | 6,639 | 17.4 | 1.22 | 45.42 | 57.48 | 77.143 |
| 9 | 11 | 815 | 5,971 | 19.3 | 1.40 | 37.99 | 57.65 | 75.854 |

EXAMPLE 10

A common dent corn starch was hydrolyzed substantially as described in Examples 1–4, but the temperature during hydrolysis was maintained at 60° C. and the hydrolysis reaction times were as set forth below in Table 2. After neutralization of the reaction slurry, the slurry was heated to 75° C. and held at that temperature for the time indicated in Table 2, below. The % yield is a total yield based on starting starch solids.

TABLE 2

Effect of Post-neutralization Heat Treatment on Common Starch Hydrolysate

| Hydrolysis Time (hrs.) | Post- Heat Time (hrs.) | Dextrose in Slurry (wt. %) | Yield Stress (pascals) | Mw (g/mol) | CWS (wt. %) | Ash (wt. %) | Insolubles (wt. %) | Yield (wt. %) | DSC (°C.) Onset | Peak |
|---|---|---|---|---|---|---|---|---|---|---|
| 25 | none | 1.15 | 192 | 7,402 | 17.4 | .94 | 49.95 | 59.47 | 65.62 | 77.25 |
|  | 1 | — | 442 | 7,559 | 18.2 | 1.09 | 42.31 | 52.68 | 68.84 | 81.97 |
|  | 2 | — | 439 | 7,552 | 17.7 | 1.05 | 41.05 | 52.45 | 71.77 | 82.66 |
| 27 | none | 1.39 | 269 | 7,097 | 17.1 | .99 | 48.62 | 58.01 | 66.86 | 77.81 |
|  | 1 | — | 482 | 7,154 | 18.7 | 1.16 | 40.67 | 52.41 | 70.78 | 82.72 |
|  | 2 | — | 357 | 7,172 | 19.4 | 1.25 | 41.55 | 52.58 | 70.98 | 81.73 |
| 29 | none | 1.61 | 336 | 6,907 | 17.6 | 1.01 | 47.28 | 56.94 | 67.68 | 78.55 |
|  | 1 | — | 602 | 6,985 | 18.2 | 1.14 | 40.48 | 50.25 | 70.38 | 82.68 |
|  | 2 | — | 637 | 6,914 | 17.5 | 1.19 | 40.11 | 50.51 | 71.28 | 82.69 |

EXAMPLE 11

A high amylose corn starch (HI-SET C) was hydrolyzed substantially as described in Examples 1–4, but the temperature during hydrolysis was maintained at 70° and the hydrolysis reaction times were as set forth below in Table 3. After neutralization of the reaction slurry, the slurry was heated to 85° C. and held at that temperature for the time indicated in Table 3, below. Again, the % yield is a total yield based on starting starch solids.

TABLE 3

Effect of Post-neutralization Heat Treatment on High Amylose Corn Starch Hydrolysate

| Hydrolysis Time (hrs.) | Post- Heat Time (hrs.) | Dextrose in Slurry (wt. %) | Yield Stress (pascals) | Mw (g/mol) | CWS (wt. %) | Ash (wt. %) | Insolubles (wt. %) | Yield (wt. %) | DSC (°C.) Onset | Peak |
|---|---|---|---|---|---|---|---|---|---|---|
| 5 | none | .746 | 150 | 8,353 | 15.6 | 1.16 | 61.42 | 72.05 | 70.83 | 86.48 |
|  | 1 | — | 174 | 8,615 | 15.5 | 1.24 | 57.11 | 68.75 | 83.13 | 94.31 |

TABLE 3-continued

Effect of Post-neutralization Heat Treatment on High Amylose Corn Starch Hydrolysate

| Hydrolysis Time (hrs.) | Post-Heat Time (hrs.) | Dextrose in Slurry (wt. %) | Yield Stress (pascals) | Mw (g/mol) | CWS (wt. %) | Ash (wt. %) | Insolubles (wt. %) | Yield (wt. %) | DSC (°C.) Onset | Peak |
|---|---|---|---|---|---|---|---|---|---|---|
|   | 2 | — | 204 | 8,561 | 15.0 | 1.24 | 54.09 | 67.47 | 86.31 | 94.26 |
| 6 | none | 1.04 | 175 | 7,659 | 15.3 | 1.14 | 57.23 | 68.32 | 70.44 | 86.37 |
|   | 1 | — | 276 | 7,832 | 15.9 | 1.20 | 53.58 | 65.21 | 83.91 | 94.88 |
|   | 2 | — | 278 | 7,807 | 14.7 | 1.18 | 49.82 | 64.04 | 85.65 | 96.23 |
| 7 | none | 1.29 | 274 | 7,056 | 15.4 | 1.16 | 54.28 | 63.88 | 71.43 | 86.61 |
|   | 1 | — | 364 | 7,180 | 15.8 | 1.18 | 48.24 | 62.23 | 83.40 | 94.94 |
|   | 2 | — | 362 | 7,203 | 15.0 | 1.12 | 46.03 | 63.20 | 84.77 | 94.77 |

EXAMPLE 12

A high amylose corn starch (HI-SET C) was hydrolyzed substantially as described in Examples 1–4, but the temperature during hydrolysis was maintained at 70° and the hydrolysis reaction times were as set forth below in Table 4. After neutralization of the reaction slurry, the slurry was, in Examples 12C, 12E, 12F, 12G, 12I and 12K, heated to 90° C. and held at that temperature for one (1) hour. In Examples 12E and 12I, the slurry was separated immediately after removal from heat, while in Examples 12F and 12K the slurry was allowed to cool to room temperature in an ambient environment (and in Example 12G in a chilled environment) prior to separation.

TABLE 4

Effect of Heat Treatment and Isolation Techniques on High Amylose Corn Starch Hydrolysate

| Example | Hydrolysis Time (hrs.) | Post-Heat Time (hrs.) | Dextrose in Slurry (wt. %) | Yield Stress (pascals) | Mw (g/mol) | CWS (wt. %) | Hydrolysis Time (hrs.) | Ash (wt. %) | Insolubles (wt. %) | Yield (wt. %) | DSC (°C.) Onset | Peak |
|---|---|---|---|---|---|---|---|---|---|---|---|---|
| 12A | 2.6 | 0 | 0.27 | — | — | — | 2.6 | — | 62.67 | — | — | — |
| 12B | 5 | 0 | 0.93 | 106 | 7,396 | 15 | 5 | 1.2 | 51.32 | 73.25 | 73.11 | 90.38 |
| 12C | 5 | 1 | — | 636 | 7,879 | 13.3 | 5 | 0.94 | 30.22 | 47.56 | 87.91 | 100.91 |
| 12D | 7 | 0 | 1.53 | 440 | 6,225 | 14.7 | 7 | 1.14 | 45.68 | 57.61 | 71.73 | 95.65 |
| 12E | 7 | 1 | — | 907 | 6,633 | 11 | 7 | 0.81 | 24.87 | 43.87 | 87.11 | 101.1 |
| 12F | 7 | 1 | — | 574 | 6,428 | 14.3 | 7 | 1.15 | 41.95 | 54.22 | 88.02 | 101.1 |
| 12G | 7 | 1 | — | 561 | 6,610 | 11.7 | 7 | 0.78 | 39.18 | 51 | 86.69 | 101.19 |
| 12H | 5.25 | 0 | 0.999 | — | 7,581 | 14.7 | 5.25 | 1.11 | 49.69 | 69.13 | — | — |
| 12I | 5.25 | 1 | — | 412 | 8,030 | 13.2 | 5.25 | 1.11 | 31.15 | 54.16 | 86.76 | 98.36 |
| 12J | 7.25 | 0 | 1.57 | — | 6,508 | 15.4 | 7.25 | 1.06 | 46.64 | 63.94 | — | — |
| 12K | 7.25 | 1 | — | 444 | 6,723 | 16 | 7.25 | 1.31 | 45.18 | 57.69 | 86.56 | 99.17 |

EXAMPLE 13

| Ingredients | Per 100 lbs. ds starch | Per 800 lbs. as is batch |
|---|---|---|
| High amylose corn starch (HI-SET C) | 100 lbs. | 708 lbs. |
| Muriatic acid (HCl), 20° Baume | 10.7 lbs. | 76 lbs. |
| Sodium hydroxide, ds | 3.7 lbs. | 26 lbs. |

Procedure

Add 149 gals. city water to heated and agitated tank. Turn agitator on high and add 800 lbs. as is HI-SET C. (The HI-SET C is optionally pretreated in accordance with the teachings of U.S. Pat. No. 4,477,480.) Adjust slurry solids to 35.0 to 36.5%, if necessary. Heat slurry to 70° C. Add 76 lbs. of 20° Baume muriatic acid. Check titer and adjust to 0.322 meq/g, if necessary. Turn agitator to low and heat to 70° C.

React at 70° C. for about 5.5 hrs. to a YSI dextrose value of 1.00%. After 2 hrs. of reaction, check YSI dextrose. When YSI will be 1.00%, neutralize to 3.0 to 4.0 pH with 50% caustic solution. Heat slurry to 90° C. and maintain temperature for 1 hr. Cool to 70° C., transfer to microfiltration feed tank.

Concentrate slurry to about 44% solids and diafilter to 1.5% ash in microfiltration unit. Spray dry microfiltration retentate.

EXAMPLE 14

| Ingredients | Per 100 lbs. ds starch | Per 800 lbs. as is batch |
|---|---|---|
| Dent corn starch | 100 lbs. | 720 lbs. |
| Muriatic acid, 20° Baume | 10.7 lbs. | 77 lbs. |
| Sodium hydroxide | 3.7 lbs. | 27 lbs. |

Procedure

Add 150 gals. city water to heated and agitated tank. Turn agitator on high and add 800 lbs. as is dent corn starch. (The dent corn starch is optionally pretreated in accordance with the teachings of U.S. Pat. No. 4,477,480.) Adjust slurry solids to 35.0 to 36.5%, if necessary. Heat slurry to 60° C. Add 77 lbs. of 20° Baume muriatic acid. Check titer and adjust to 0.322 meq/g, if necessary. Turn agitator to low and heat to 60° C.

React at 60° C. to a YSI dextrose value of 1.17%. After 12 hrs. of reaction, pull a sample every 2 hrs. and measure YSI dextrose. When YSI is expected to be 1.17%, neutralize to 3.0 to 4.0 pH with 50% caustic solution. Heat slurry to 70° C. and let stir for 1 hr. Heat slurry to 80° C. and let stir for 1 hr. Cool at 70° C., transfer to microfiltration feed tank. Concentrate slurry to about 44% solids and diafilter to 1.5% ash in the microfiltration unit. Spray dry microfiltration retentate.

What is claimed is:

1. A method of preparing a starch hydrolysate comprising (a) maintaining a strongly acidic aqueous slurry comprised of a granular amylose starch at a temperature greater than 70° C. and below both (i) the gelatinization temperature of said granular starch in said slurry and (ii) the atmospheric boiling point of said slurry, to hydrolyze a substantial portion of said granular starch and retain a starch hydrolysate residue insoluble in said strongly acidic aqueous slurry, and (b) fragmenting the starch hydrolysate residue by mechanical disintegration at a temperature below the gelatinization temperature of the starch hydrolysate residue, thereby producing a nongelatinized, fragmented starch hydrolysate;

wherein at least about 95% of the fragmented hydrolysate has a particle size of less than 45 microns.

2. An aqueous dispersion comprising a minor amount by weight of a nongelatinized, fragmented, granular amylose starch hydrolysate and a major amount by weight of an aqueous liquid, said fragmented, granular, amylose starch hydrolysate having a melting onset temperature of at least 70° C. when measured at about 20% starch hydrolysate solids, wherein said fragmented, granular, amylose starch hydrolysate has been fragmented by mechanical disintegration, and wherein at least about 95% of the fragmented hydrolysate has a particle size of less than 45 microns.

3. A method of pasteurizing a foodstuff comprising combining an aqueous dispersion of a nongelatinized, fragmented, granular, amylose starch hydrolysate with a food stuff material and heating said aqueous dispersion to a temperature of at least about 72° C. for a time sufficient to pasteurize said aqueous dispersion, said fragmented, granular amylose starch having a melting onset temperature of at least 70° C. when measured at about 20% starch hydrolysate solids, wherein said fragmented, granular, amylose starch hydrolysate has been fragmented by mechanical disintegration, and wherein at least about 95% of the fragmented hydrolysate has a particle size of less than 45 microns.

4. A method of preparing a starch hydrolysate comprising:

maintaining a strongly acidic aqueous slurry comprised of a granular amylose starch at a temperature not greater than both 70° C. and the gelatinization temperature of said granular starch in said slurry to hydrolyze a substantial portion of said granular starch and retain a starch hydrolysate residue insoluble in said strongly acidic aqueous slurry, then heating an aqueous slurry of said starch hydrolysate residue at a substantially neutral pH to raise the melting onset temperature of said starch hydrolysate residue to at least 70° C. when measured at 20% starch hydrolysate solids, and fragmenting the starch hydrolysate residue by mechanical disintegration at a temperature below the gelatinization temperature of the starch hydrolysate residue, thereby producing a nongelatinized, fragmented, starch hydrolysate residue;

wherein at least about 95% of the fragmented hydrolysate has a particle size of less than 45 microns.

5. A method of formulating a food containing a fat and/or oil ingredient comprising replacing at least a substantial portion of said fat and/or oil ingredient with a nongelatinized, fragmented, granular amylose starch hydrolysate, having a melting onset temperature of at least 70° C. when measure at about 20% starch hydrolysate solids, wherein said fragmented, granular, amylose starch hydrolysate has been fragmented by mechanical disintegration and wherein at least about 95% of the fragmented hydrolysate has a particle size of less than 45 microns.

6. A method of claim 5 wherein an aqueous dispersion of said fragmented, granular, amylose starch hydrolysate exhibits a transition in dynamic elastic modulus versus shear strain from substantially constant dynamic elastic modulus to decreasing dynamic elastic modulus, said transition being exhibited at a shear strain of less than about 50 millistrain.

7. A method of claim 5 wherein said fragmented, granular, amylose starch hydrolysate is derived from starch from a variety of Zea mays.

8. A method of claim 5 wherein said fragmented, granular, amylose starch hydrolysate is derived from a starch having an amylose content of at least about 40% by weight.

9. A method of claim 5 wherein said fragmented, granular, amylose starch hydrolysate is derived from high amylose corn starch having an amylose content of at least about 50% by weight.

10. A method of claim 5 wherein the amylose of said fragmented, granular, amylose starch hydrolysate has a weight average molecular weight of from about 3,000 to about 12,000 g/mol.

11. A method of claim 5 wherein the amylose of said fragmented, granular, amylose starch hydrolysate has a weight average molecular weight of from about 5,500 to about 10,000 g/mol.

12. A food formulation having a reduced level of fat and/or oil comprising a mixture of a foodstuff and a nongelatinized, fragmented, granular amylose starch hydrolysate, having a melting onset temperature of at least 70° C. when measured at about 20% starch hydrolysate solids, as a replacement for at least a substantial portion of the fat and/or oil of said food formulation, wherein said fragmented, granular, amylose starch hydrolysate has been fragmented by mechanical disintegration, and wherein at least about 95% of the fragmented hydrolysate has a particle size less of than 45 microns.

13. A food formulation of claim 12 wherein an aqueous dispersion of said fragmented, granular, amylose starch hydrolysate exhibits a transition in dynamic elastic modulus versus shear strain from substantially constant dynamic elastic modulus to decreasing dynamic elastic modulus, said transition being exhibited at a shear strain of less than about 50 millistrain.

14. A food formulation of claim 12 wherein fragmented, granular, amylose starch hydrolysate is derived from starch from a variety of Zea mays.

15. A food formulation of claim 12 wherein said fragmented, granular, amylose starch hydrolysate is derived from a starch having an amylose content of at least about 40% by weight.

16. A food formulation of claim 12 wherein said fragmented, granular, amylose starch hydrolysate is derived from high amylose corn starch having an amylose content of at least about 50% by weight.

17. A food formulation of claim 12 wherein said the amylose of said fragmented, granular, amylose starch hydrolysate has a weight average molecular weight of from about 3,000 to about 12,000 g/mol.

18. A food formulation of claim 12 wherein the amylose of said fragmented, granular, amylose starch hydrolysate has a weight average molecular weight of from about 5,500 to about 10,000 g/mol.

* * * * *